(12) United States Patent
Sandhawalia et al.

(10) Patent No.: US 9,683,836 B2
(45) Date of Patent: Jun. 20, 2017

(54) VEHICLE CLASSIFICATION FROM LASER SCANNERS USING FISHER AND PROFILE SIGNATURES

(71) Applicant: Xerox Corporation, Norwalk, CT (US)

(72) Inventors: Harsimrat Singh Sandhawalia, Grenoble (FR); Jose Antonio Rodriguez Serrano, Grenoble (FR); Herve Poirier, Meylan (FR); Gabriela Csurka, Crolles (FR)

(73) Assignee: Conduent Business Services, LLC, Dallas, TX (US)

( * ) Notice: Subject to any disclaimer, the term of this patent is extended or adjusted under 35 U.S.C. 154(b) by 877 days.

(21) Appl. No.: 13/963,472

(22) Filed: Aug. 9, 2013

(65) Prior Publication Data

US 2015/0046119 A1   Feb. 12, 2015

(51) Int. Cl.
*G01B 11/24* (2006.01)
*G06K 9/00* (2006.01)
*G06K 9/46* (2006.01)
*G06K 9/62* (2006.01)
(Continued)

(52) U.S. Cl.
CPC ............ *G01B 11/24* (2013.01); *G06K 9/0014* (2013.01); *G06K 9/00147* (2013.01); *G06K 9/00187* (2013.01); *G06K 9/00214* (2013.01); *G06K 9/4676* (2013.01); *G06K 9/6247* (2013.01); *G01B 11/2518* (2013.01); *G06K 9/54* (2013.01)

(58) Field of Classification Search
CPC .......... G06K 9/00147; G06K 9/00161; G06K 9/00214; G06K 9/4676; G06K 9/481; G06K 9/54; G06K 9/58; G06K 9/0014; G06K 9/00187; G06K 9/6247; G01B 11/24; G01B 11/2518; G01B 11/25
USPC ......................................................... 702/167
See application file for complete search history.

(56) References Cited

U.S. PATENT DOCUMENTS 5,392,034 A    2/1995 Kuwagaki
6,195,019 B1 *  2/2001 Nagura ................ G07B 15/063
                                                235/384
6,304,321 B1   10/2001 Wangler et al.
(Continued)

OTHER PUBLICATIONS

Yonglin et al, Feature Extraction from Vehicle-borne Laser Scanning Data, 2008.*
(Continued)

*Primary Examiner* — Jonathan C Teixeira Moffat
*Assistant Examiner* — Lynda Dinh
(74) *Attorney, Agent, or Firm* — Kermit D. Lopez; Luis M. Ortiz; Ortiz & Lopez, PLLC

(57) ABSTRACT

Methods, systems and processor-readable media for vehicle classification. In general, one or more vehicles can be scanned utilizing a laser scanner to compile data indicative of an optical profile of the vehicle(s). The optical profile associated with the vehicle(s) is then pre-processed. Particular features are extracted from the optical profile following pre-processing of the optical profile. The vehicle(s) can be then classified based on the particular features extracted from the optical feature. A segmented laser profile is treated as an image and profile features that integrate the signal in one of the two directions of the image and Fisher vectors which aggregate statistics of local "patches" of the image are computed and utilized as part of the extraction and classification process.

20 Claims, 7 Drawing Sheets

(51) Int. Cl.
G06K 9/54 (2006.01)
G01B 11/25 (2006.01)

(56) References Cited

U.S. PATENT DOCUMENTS

| | | | |
|---|---|---|---|
| 7,970,644 B2 | 6/2011 | Hedley et al. | |
| 8,009,062 B2 | 8/2011 | Rothschild | |
| 8,111,174 B2 | 2/2012 | Berger et al. | |
| 8,364,334 B2 | 1/2013 | Au et al. | |
| 2001/0050621 A1 | 12/2001 | Lees | |
| 2011/0162221 A1 | 7/2011 | Knoke et al. | |
| 2012/0045134 A1* | 2/2012 | Perronnin | G06K 9/6234 382/197 |
| 2013/0028508 A1 | 1/2013 | Perronnin et al. | |
| 2013/0242314 A1* | 9/2013 | Fowler | G01S 17/42 356/601 |

OTHER PUBLICATIONS

Ferreira, P. et al., "Integrated Vehicle Classification System," IEEE Intelligent Vehicles Symposium (IV) (2011), Baden-Baden, Germany, Jun. 5-9, 6 pages.
Harlow, C. et al., "Automatic vehicle classification system with range sensors," Transportation Research Part C (2001) 9:231-247.
Partial EP Search Report for EP Application No. 14179609.4 dated Apr. 1, 2015.
Shibuhisa, Sato, Takahashi, Ide, Murase, Kojima, Takahashi; Accurate Vehicle Localization using DTW Between Range Data Map and Laser Scanner Data Sequences; 2007 IEEE Intelligent Vehicles Symposium, Jun. 13-15, 2007.
Csurka, Dance, Fan, Williamowski, Bray; Visual Categorization with Bags of Keypoints, Xerox Research Centre Europe.
Bottou, Leon; Stochastic Learning; NEC Labs of America.
Lowe; Distinctive Image Features from Scale-Invariant Keypoints: Journal; Jan. 5, 2004; Computer Science Dept. University of British Columbia.
Perronnin, Dance; Fisher Kernels on Visual Vocabularies for Image Categorization; Xerox Research Centre Europe.
Lazebnik, Schmid, Ponce; Beyond Bags of Features; Spatial Pyramid Matching for Recognizing Natural Scene Categories.
Perronnin, Sanchez, Mensink; Improving the Fisher Kernel for Large-Scale Image Classification; Xerox Research Centre Europe.
Torralba, Fergus, Freeman; 80 Million Tiny Images; A Large Dataset for Non-Parametric Object and Scene Recognition; IEE Transactions on Pattern Analysis and Machine Intelligence.

* cited by examiner

VEHICLE CLASSIFICATION FROM LASER SCANNERS USING FISHER AND PROFILE SIGNATURES

TECHNICAL FIELD

Embodiments are generally related to the classification of vehicles. Embodiments are also related to laser scanners. Embodiments further relate to Fisher and profile signatures.

BACKGROUND OF THE INVENTION

The ability to classify vehicles quickly and efficiently is needed in a number of transportation and security applications. Laser scanner sensors have been employed for vehicle classification. In general, laser scanners are time-of-flight measuring devices that emit extremely short pulses of light towards objects. These devices can detect the part of the light that is reflected from the objects, measure the time difference between emission and reflection, and derive a distance to the object. The operation is repeated for a varying set of angles. Scanners are usually placed overhead, with the laser curtain facing downwards, and perpendicular to the traffic direction, so that the scanner plane cuts the vehicle in transversal "slices".

These scanners thus provide means for vehicle classification. Although other sensors such as electromagnetic loop detectors are also used for this purpose, these usually involve road works and cannot be placed in sensitive locations such as bridges. Laser scanners are a common type of equipment for vehicle classification, especially for determining the vehicle type in tolls. However, this is usually achieved by simple solutions such as extracting a few high-level features and classifying them (sometimes with simple rules), or matching the raw laser profiles.

As an example, some systems have been developed for vehicle classification, which extract the following features from a laser scan: width, height, length, number of vehicle units, height of the first unit. Using this approach, vehicles can be classified using simple rules comparing feature values with pre-specified thresholds. While such an approach might provide initial satisfactory performance, it is limited in scope and efficiency, requires intense human labor and expertise, and lacks learning classification capabilities.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved vehicle classification methods and systems.

It is another aspect of the disclosed embodiments to provide a vehicle classification approach based on data obtained from laser scanners.

It is a further aspect of the disclosed embodiments to provide for vehicle type classification from laser scanner profiles based on benchmarking feature descriptors.

The aforementioned aspects and other objectives and advantages can now be achieved as described herein. Methods and systems for vehicle classification are disclosed herein. In general, one or more vehicles can be scanned utilizing a laser scanner to compile data indicative of an optical profile of the vehicle(s). The optical profile associated with the vehicle(s) is then pre-processed. Particular features are extracted from the optical profile following pre-processing of the optical profile. The vehicle(s) can be then classified based on the particular features extracted from the optical feature.

The pre-processing operation can involve isolating at least one individual profile from the data indicative of the optical profile; correcting scan reading errors associated scanning the vehicle(s) utilizing the laser scanner; and segmenting data indicative of a vehicle body from the data indicative of the optical profile. Additionally, particular features can be extracted including, for example, Fisher vectors. Alternatively, the particular features can be extracted including profile features by computing an integral in a horizontal direction and/or in a vertical direction with respect to the optical profile Classifying the vehicle based on the particular features extracted from the optical feature, can further involve training at least one classifier, for instance a linear SVM (Support Vector Machine), utilizing the particular features extracted from the optical feature; and classifying the vehicle(s) based on data output from the classifier (e.g. linear SVM). Particular features extracted from the optical feature include human-used attributes and/or a feature set extracted from profile images that include at least one of the following: raw profile features; and Fisher signatures.

The disclosed embodiments deal with problem of vehicle classification from laser scanner profiles. A laser scanner is a time-of-flight measuring device that obtains a (3D) height profile of the vehicle driving beneath it. Two previous techniques for classifying profiles include extracting a few high-level features (width, height, etc) from the profile measured, and then using a classifier; or looking up the raw profile in a database of pre-recorded templates.

The disclosed embodiments involve the use of a linear classifier with more complex features than just the high-level features or the raw profiles mentioned above. In particular, the disclosed embodiments are capable of using features that are known in the computer vision domain. In one variant, Fisher vectors, extracted either from "patches" of the profile (viewed as an image), can be employed. In a second variant, profile features, obtained by computing the integral in the horizontal and/or vertical direction of the profile, can be utilized. Such features are unique in the context of vehicle classification with laser scanner profiles as demonstrated in more detail herein.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
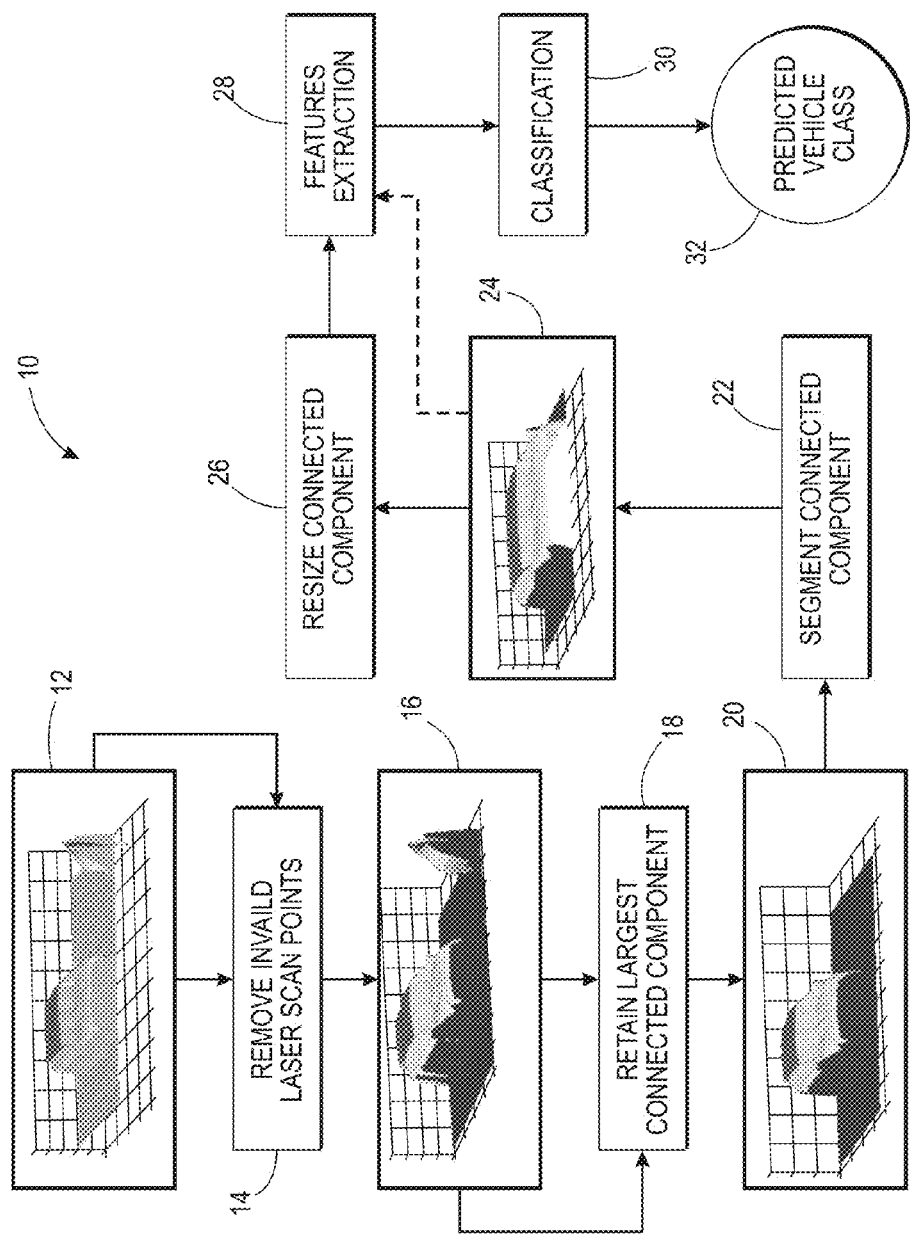
FIG. 1 illustrates a high-level flow chart of operations depicting logical operational steps of a laser profile classification method, which can be implemented in accordance with a preferred embodiment.

FIG. 1 illustrates a high-level flow chart of operations depicting logical operational steps of a laser profile classification method 10, which can be implemented in accordance with a preferred embodiment. In general, laser profile data can be generated from a laser scan operation, as shown at block 12. Thereafter, as depicted at block 14, an operation can be performed to remove invalid laser scan points. Data generated, as shown at block 16 is then subject to an operation to retain the largest connected component as shown at block 18. Thereafter, data generated (as a result of the operation depicted at block 18) as shown at block 20 is then subject to an operation to segment the connected component(s) as indicated at block 22. Resulting data as indicated at block 24 is then subject to an operation that resizes the connected component(s) as illustrated at block 26. Data generated as a result of the operation shown at block 28 is then subject to a feature extraction operation, as indicated at block 28 and then subject to a classification operation as indicated at block 32. Finally, an operation can be implemented to predict one or more vehicle classes as described at block 32.

In a preferred embodiment, vehicle profiles can be acquired using a laser scanner. Such a laser scanner is a time-of-flight measuring device that emits extremely short pulses of light towards objects. The laser scanner also detects the part of the light that is reflected from the object, and measuring the time difference between emission and reflection (typically a fraction of a second), derives a distance to the object. The operation can be repeated for a varying set of angles, so that each scan covers a linear "row" of up to 100 degrees.

In one scenario, scanners can be placed on top of, for example, a gantry in a S-lane road, one scanner per lane, with the laser curtain facing downwards, and perpendicular to the traffic direction, so that the scanner measures the height of vehicles in transversal "slices". With the current configuration each "slice" or "row" can include 91 points while the number of rows varies depending on the length (and speed) of the vehicle, and is generally between 20 and 30 rows for a typical passenger vehicle.

Signal pre-processing is an important part of the process described herein. A pre-processing module can be employed to reduce the noise in the measured signal, and to segment the signals of individual vehicles to feed the classifier with information from one vehicle at a time.

The following sequence of operations (shown in FIG. 1) can be performed:

Isolating individual transactions: In absence of vehicles the height measured by the scanner is near-zero. Setting a threshold on the height level is sufficient to correctly separate the different vehicles with a 99.5% accuracy.

Correction of invalid scanned points: In some cases, the scanner fails to provide the height reading for some of the points in the profile. This is the case for some specific materials that do not exhibit sufficient reflectivity, due to high speeds or sometimes even due to weather conditions. Since the set of missing points is typically a small fraction of all the points in the laser profile, a simple interpolation based on nearest-neighbor has shown to be sufficient to reconstruct the laser profiles, however more complex methods cold also be applied.

Speed correction: Speed is accurately measured with an external loop sensor system. Once the speed of a vehicle is known, the profile can be interpolated to have the number of rows that would have been obtained by a vehicle driving at a reference speed.

Vehicle body segmentation: Since the scan range is relatively wide, up to 100 degrees, the laser profiles sometimes present artifacts on their edges, typically corresponding to parts of vehicles driving in neighboring lanes. Therefore, the part of the profile corresponding to the vehicle of interest can be cropped. To that end, each point in the profile can be labeled as object or background based on simple thresholding of the signal and group the object points into connected components. The rectangular region that contains the largest connected component can be retained for the crop.

Vehicle classification (e.g., see block 30 of FIG. 1) is an important part of the overall disclosed system/method. The aim of the vehicle classification is to predict for each car passing on the lane to which vehicle class it belongs to. To construct such classifiers, a set of training laser profiles can be manually annotated and for each laser profile a set of different type of features can be extracted as described in greater detail herein. In general, for each type of feature and each vehicle class, one-versus-all linear classifiers can be trained:

$$y = wx + b \quad (1)$$

where x is a feature vector representing the pre-processed laser profile and the parameters w and b were obtained through a learning algorithm such as stochastic gradient descent (SGD). As indicated previously, laser profiles are initially pre-processed. Hence, the input for all feature descriptors is the 2D cropped laser signal corresponding to the largest connected component in the original laser profile.

We denote this signal as:

$$H = \{h_{ij}\} \quad (2)$$

where hij expresses the height measurement at row i and column j of the profile, with $i=1, \ldots, L$, and $j=1, \ldots, W$, where W and H denote, respectively, the total number of columns (width) and rows (length) of the cropped laser profile.

Our aim is to study which are the features we can extract from this laser profile in order to build the best vehicle classifier. Therefore, different types of features can be employed as described in detail below.

Attribute-based features (ATT) can be considered in the context of the approach described herein. That is, attributes are often, especially by humans, to categorize the vehicles into different classes especially if these classes are as in our case passenger vehicles with respectively without a trailer, truck without, with one or with two trailers and motorcycles. Therefore, our first feature vector can be the set of following attributes we extract from the 2D laser profile:

the width of the profile (W),
the length of the profile (L),
the maximum height of the profile ($\max_{ij} h_{ij}$)
number of units
the maximum height of the first unit.

To extract the two latter attributes, the laser profile is segmented into units, with threshold heuristics. The number of units found is provided as fourth attribute. Then the maximum height within the first unit denoted by FU can be computed according to equation (3) below:

$$\max_{j,i \in FU} h_{ij} \quad (3)$$

Note that intuitively, the first 3 attributes capture the fact that usually different vehicle types exhibit different distributions in size. Attributes 4 and 5 exploit the fact that the number (and size) of units attached to the vehicle might also be indicative of the vehicle class. Finally, the 5 attributes can be collected into a single feature vector x and will refer to it as attribute based features (denoted by ATT).

Figure 2:
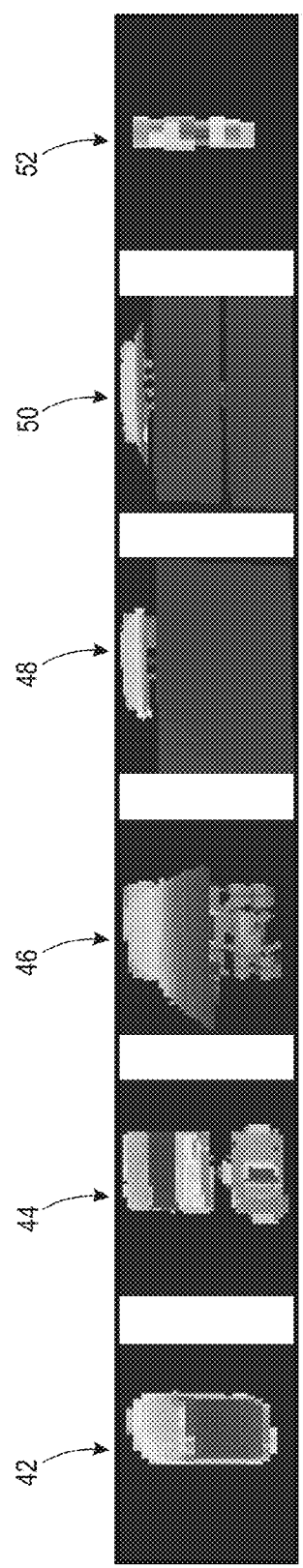
FIG. 2 illustrates graphs depicting examples of 2D images corresponding to laser profiles, in accordance with the disclosed embodiments.

FIG. 2 illustrates graphs depicting examples of 2D images corresponding to laser profiles, in accordance with the disclosed embodiments. The images 42, 44, 46, 48, 50 and 52 shown in FIG. 2 can be represented with a color map (not shown) where, for example, blue represents values indicating low heights and red values may indicate larger heights. Note that a 3D laser profile can be represented as a 2D image, where the width and length of the profile (W×L) provides the image sizes and the value of each pixel $U_{ij}$ is equal to the corresponding height $h_{ij}$ (i.e., see the examples shown in FIG. 2).

This means that in this case we can consider the categorization of the laser scanner profiles as an image categorization problem. The literature is very rich in proposing different image representations for categorization but this invention experiments mainly with two popular representations. The following actual features can thus be computed. The first representation provides experimental evidence that resizing the images to a small size and using the pixels concatenated into a single vector directly as features provides good results in several computer vision tasks. The second representation is a Fisher vector representation of the image, which has shown state-of-the art image representation with different type of images on different tasks including categorization and retrieval.

RAW (Raw Profiles Features) can be employed in certain scenarios. That is, if we desire to use the pixels (heights) of the profile images direct transformed into a feature vector $V = \{h_{11}, \ldots, h_{wl}\}$, we have again different sizes of windows as W and H vary from one image to another. Therefore, we can first apply a standard resizing operation based on bilinear interpolation to a fixed size of W'=L'. If we denote the resized "image" with $H' = \{h_{lm}'\}$, then a feature vector V' can be configured by stacking W'L'. Experimentally, we have found, for example, that W'=L'=15 yields the best practical results.

Before feeding this feature vector V' to one-versus-all classifiers, we can $L_2$ normalize the classifiers as this normalization approach has been shown to bring further improvements. The features can be referred to as raw profile features and denoted by RAW.

FIS (Fisher Image Signatures) can be employed with respect to a second profile imaging technique. The Fisher vector representation of the image is an extension of the so-called Bag-of-visual-word (BOV) representation. The main idea of such approaches is to transform the set of local features into a high-level representation based on an intermediate representation, the visual vocabulary, built in the low-level feature space. Most often gradient orientation histograms such as the popular SIFT descriptor extracted on local patches can be used as low level features either directly or first projected in some lower dimensional space using PCA (Principal Component Analysis). In our experiments, we have projected the 128 dimensional gradient orientation histograms into 32 dimensions with PCA and constructed a visual vocabulary of 64 Gaussians in the projected space.

The visual vocabulary can be modeled by a GMM (Gaussian Mixture Model) as indicated by equation (4) below:

$$p(h/\lambda) = \sum_{n=1}^{N} \omega_n N\left(h \mid \mu_n, \sum_n\right) \quad (4)$$

where $h_i$ is a local low level feature (in this case—a gradient histogram) and $\lambda=\{\omega_n, \mu_n, \Sigma_n; n=1, \ldots, N\}$ is the set of all parameters of the GMM and each Gaussian corresponds to a visual word.

In the case of BOV representation, the profile image seen as a set of low-level descriptors $I=\{h_i; i=1, \ldots, T\}$ is transformed into a high-level, N dimensional descriptor, $\gamma_I$, by accumulating over all low-level descriptors and for each Gaussian, the probabilities of generating each descriptor is indicated by equations (5) and (6) below:

$$\gamma I = \left[\sum_{i=1}^{T} \gamma_1(h_i), \ldots, \sum_{i=1}^{T} \gamma_N(h_i)\right] \quad (5)$$

where $$\gamma_n(h_i) = \frac{\omega_n N\left(h_i \mid \mu_n, \sum_n\right)}{\sum_{j=1}^{N} \omega_j N\left(h_i \mid \mu_j, \sum_j\right)} \quad (6)$$

The Fisher Vector extends this "soft" BOV representation by going beyond zero-order statistics (e.g., counting) and by encoding statistics up to the second order about the distribution of local descriptors assigned to each visual word. Hench, it characterizes the low-level features set I by its deviation from the GMM distribution in the low-level features space indicated by equation (7):

$$G\lambda(I) = \frac{1}{L}\sum_{i=1}^{T} \nabla_\lambda \log\left\{\sum_{j=1}^{N} \omega_j N\left(h_i \mid \mu_j, \sum_j\right)\right\} \quad (7)$$

To compare two such distributions I and I', a natural kernel on these gradients is the Fisher Kernel indicated by equation (8) below:

$$K(I,I')=G_\lambda(I)^\perp F_\lambda^{-1} G_\lambda(I'), \quad (8)$$

where $F_\lambda$ is the Fisher Information Matrix. As $F_\lambda^{-1}$ is symmetric and positive definite, it has a Cholesky decomposition denoted by $L^T_\lambda L_\lambda$. Therefore, K(I,I') can be rewritten as a dot-product between normalized vectors using the mapping $F_A$ as indicated in equation (9) below:

$$\Gamma_\lambda(I)=L_\lambda \cdot G_\lambda(I) \quad (9)$$

Equation (9) can be referred to as the Fisher vector (FV) of the image. Hence, linear classifiers are well suited to categorize images represented by Fisher vectors. Note that the FV can be further square-rooted and L2-normalized. In general, the Fisher vector representation outperforms the BOV representation.

In the case of image categorization, it has been demonstrated that using a spatial pyramid can result in the capture of the rough geometry of the image while improving the image categorization performance. Therefore, the inventors of the present invention have also experimented with spatial pyramids and have discovered that in this case, the 1×2 spatial pyramid dividing the image in 2 horizontal parts and concatenating them into a single feature vector x performed the best.

Figure 3:
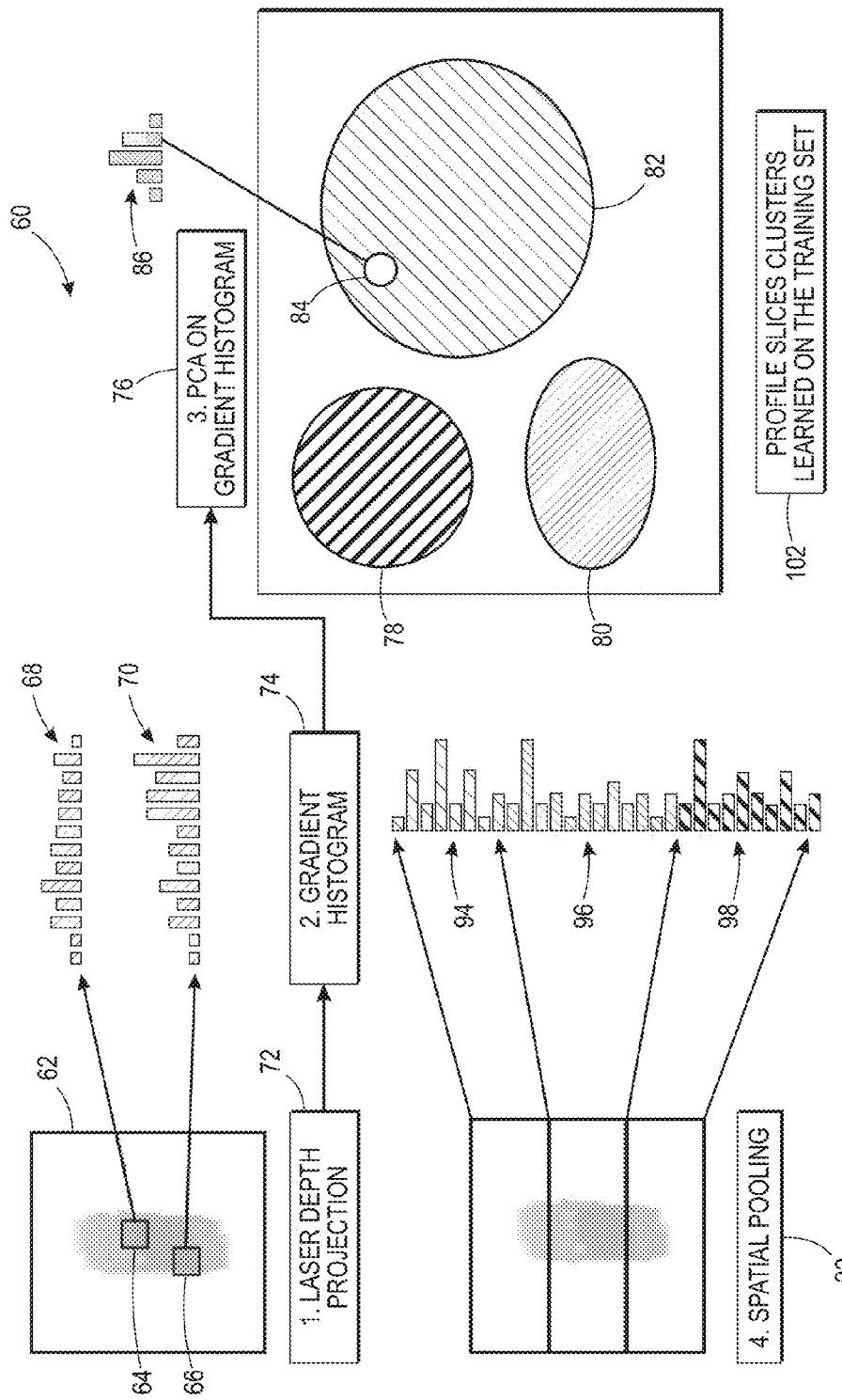
FIG. 3 illustrates a flow chart of operations depicting logical operational steps of a Fischer image signature computation that can be performed in accordance with an alternative embodiment.

FIG. 3 illustrates a flow chart of operations depicting logical operational steps of a Fisher image signature computation method 60, which can be performed in accordance with an alternative embodiment. That is, the schematic representation of the Fisher image signature (FIS) computation is shown in FIG. 3. It is important to appreciate that there are actually two types of Fisher vectors to consider—"Fisher image signatures" and "Fisher laser signatures". Both Fisher vectors follow the same general framework except that in one case the profile is treated as an image and the "local patches" are sub-images from which a histogram of gradients can be computed; in the second case, the laser signal is not treated as an image and the local patches are the raw values of the rows of the projection profile.

In general, from a laser depth projection performed, a set of local "patches" can be extracted, as shown as block 72. Local patches are sub-regions of the laser signature extracted, for example, by sampling from a regular grid of coordinates in different scales. Blocks 62 and 64 shown in FIG. 3 generally illustrate the computation of local features resulting in histograms 68, 70. That is, following processing of the laser depth projection operation depicted in block 72, gradient histograms can be implemented, as shown at block 74.

Thereafter, a principal component analysis (PCA) operation can be performed on the gradient histogram(s) as shown at block 76 and graphically illustrated by the histogram graphic 86 located above block 76 and circles 78, 80, 82, 84 depicted below block 76. Thereafter, a spatial pooling operation can be implemented, as depicted at block 92. The pooling operation will compute the Fisher vector with respect to the GMM using all the patches in the laser signal, independently for the different spatial regions defined. This operation is followed by an operation for normalizing signatures as indicated at block 100. The operations described at blocks 92, 100 are graphically illustrated by block 90 and normalized data sets 94, 96, 98. Finally, as shown at block 102, an operation can be performed in which profile slices clusters learned on the training set.

Another feature type to be considered is described next. From the user profile H (i.e., see equation (2)), side and front projection profiles can be extracted for each row respectively and each column yielding a set of side respectively front profile data denoted by $S=\{h_i\}_{i=1}^{L}$ and $F=\{f_j\}_{i=j}^{W}$. Note that the frontal projection profiles are related with the (pre-processed) transversal slices yielded by the scanner, while the side profiles are "reconstructed" from the 3D scanner data. Furthermore, these vectors ($h_i$ and $f_j$) correspond also to the lines respectively and columns in the profile images.

Again, however, such feature vectors possess variable sizes and therefore they are again rescaled to the same size (e.g., by resizing the 1 dimensional vectors or extracting them directly from the resized images). From here, simple representations can be constructed such as averaging the side respectively frontal profiles for a given laser profile or using again the Fisher framework to build Fisher laser signatures.

Another factor to consider is an MPP (Mean Projection Profile). Note that an MSP (Mean Side Profile) can be computed by averaging the profile image over columns, as indicated by equation (10) below:

$$SP_i = \frac{1}{W}\sum_j h_{ij} \qquad (10)$$

The MFP (Mean Front Profile) can be calculated by summing over rows as indicated by equation (11) below:

$$FP_j = \frac{1}{H}\sum_i h_{ij} \qquad (11)$$

Note that these mean projection profiles can be seen also as signals obtained by integrating the 3D laser profile H in one of the directions of the space.

Figure 4:
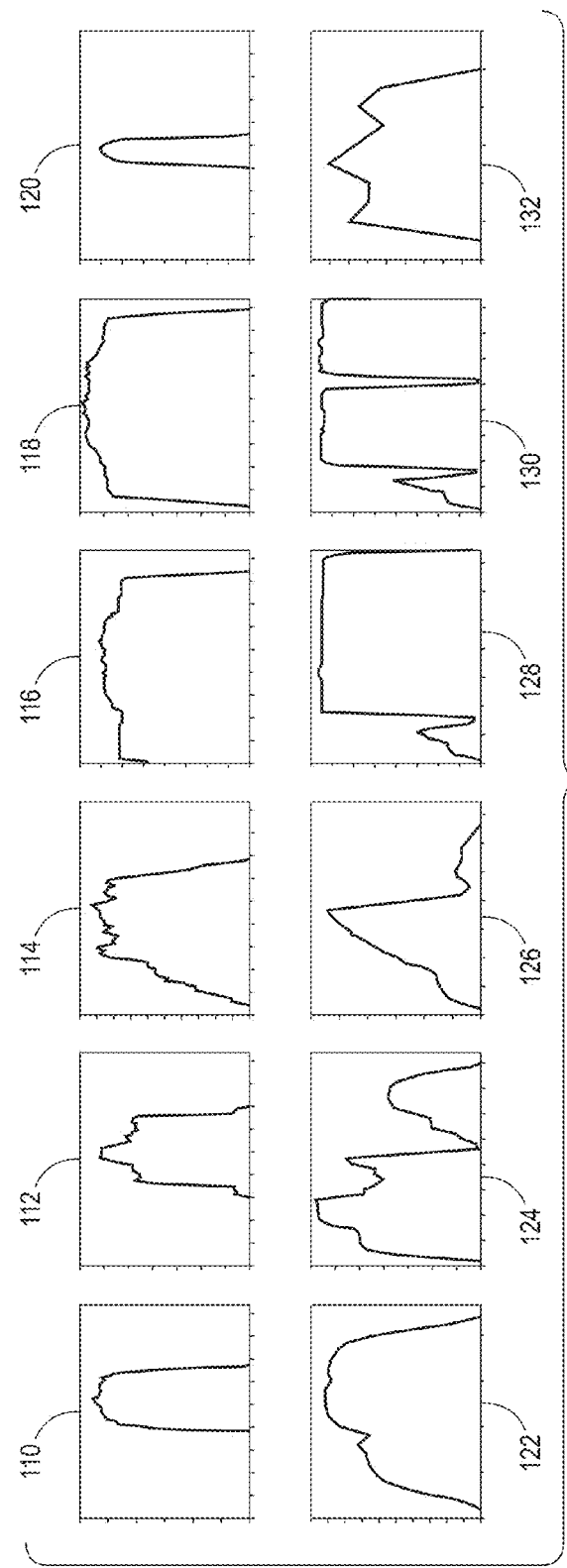
FIG. 4 illustrates example graphics depicting mean front (upper row) and side (bottom row) profiles from 5 different vehicle classes corresponding to profile images, in accordance with the disclosed embodiments.

FIG. 4 illustrates example graphics depicting mean front (upper row) and side (bottom row) profiles from 5 different vehicle classes corresponding to profile images, in accordance with the disclosed embodiments. In FIG. 4, we demonstrate the mean side profile and the mean front profile corresponding to profile images. Such data is indicated by graphs 110, 112, 114, 116, 118, 120 and 122, 124, 126, 128, 130, 132.

Before feeding the features into the classifiers, such features can be resized first to a fixed-length vector by interpolation and then $L_2$-normalized. The present inventors experimented with different dimensions and lengths between 15 to 25 dimensions were found to be optimal for the dataset.

The FLS (Fisher Laser Signature) is another feature to be considered. Note that instead of averaging these projected profiles, the laser profile H can be expressed as a set S of a projected file, as indicated in equation (12) below:

$$S = \{h'_l\}_{l=1}^{L'} \qquad (12)$$

where $h'_l = \{h'_{lm}, m=1 \ldots W'\}$, which corresponds to resized individual side projection profiles. However, as FIG. 4 and some preliminary experiences show, the side profiles are more discriminative than the front profiles and can lead to better classification performances.

As S is a set features $h'_l$ extracted for the laser profile, we can apply the Bag-of-visual-word (BOV) (which in this case becomes "bag of side projection profiles) or its Fisher framework based extension to transform this representation into a fixed-dimensional high-level representation. As described above, these representations require a visual vocabulary, built in the low-level feature space. In that case, the low level features of these vectors can be reduced with PCA.

If we denote the parameters of the "visual vocabulary" (GMM) in this space with $\lambda' = \{w'_n, \mu'_n, \Sigma'_n; n=1, \ldots, N'\}$, the BOV representation of S becomes similarly equal to equation (5):

$$\gamma S = \left[\sum_{l=1}^{L'}\gamma_1(h'_l), \ldots, \sum_{l=1}^{L'}\gamma_N(h'_l)\right] \qquad (14)$$

Where $$\gamma_n(h'_l) = \frac{\omega'_n \mathcal{N}\left(h'_l \mid \mu_n, \sum_n\right)}{\sum_{j=1}^{N'}\omega_j \mathcal{N}\left(h'_l \mid \mu_j, \sum_j\right)}. \qquad (15)$$

The corresponding Fish Vector, referred to here as FLS (Fisher Laser Signatures) can be expressed as follows:

$$\Gamma_{\lambda'}(S) = L_{\lambda'} \cdot G_{\lambda'}(S) \qquad (16)$$

with $L_{\lambda'}$ corresponding to the Cholesky decomposition of the Fisher Information Matrix $F_{\lambda'}$, and $$G_{\lambda'}(S) = \frac{1}{L'}\sum_{l=1}^{L'}\nabla_{\lambda'}\log\left\{\sum_{j=1}^{N}\omega'_j\mathcal{N}\left(h'_l \mid \mu'_j, \sum_j'\right)\right\} \qquad (17)$$

its deviation of S from the GMM distribution $\lambda'$ in the side projection profile space.

As the Fisher vector in the case of profile images, the FLS is further square-rooted and L2-normalized. To use the spatial pyramid, we can decompose the laser profiles similarly to the profile images and compute a FLS for each part. Note that this corresponds to subdividing the slices of the laser scanner in first, middle and last set of laser slices and computing side projections from the corresponding partial laser profiles reconstructed separately. A schematic representation of the Fisher laser signature computation is depicted in FIG. 5.

Figure 5:
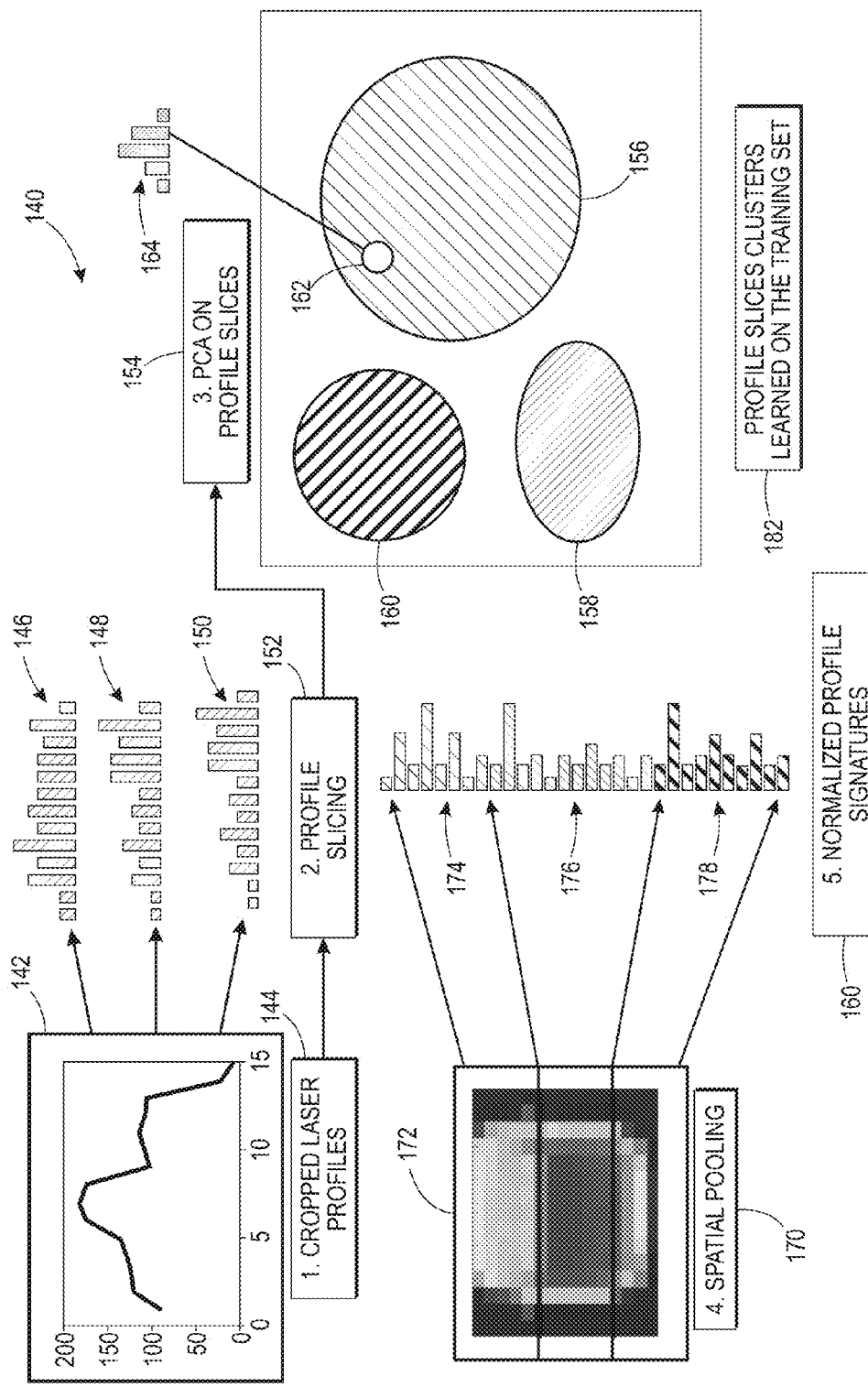
FIG. 5 illustrates a flow chart of operations depicting logical operational steps of a Fischer image signature computation that can be performed in accordance with an alternative embodiment.

FIG. 5 illustrates a flow chart of operations depicting logical operational steps of a Fischer image signature computation method 140 that can be performed in accordance with an alternative embodiment. In general, cropped profiles are generated as shown at block 144 and a profile slicing operation is then implemented as indicated at block 152. Note that the graphic 142 and histogram representations 146, 148, 150 graphically illustrated these particular steps. Thereafter, as shown at block 154, a PCA operation can be performed on profiles slices. The graphics 156, 158, 162, 164 illustrate this operation. Next, a spatial pooling operation can be implemented, as shown at block 170. Thereafter, as indicated at block 180, normalized profile signatures are generated. Graphic 172 and data sets 174, 176, 178 graphically illustrate the operations shown in blocks 170, 180. Thereafter, profile slices clusters are learned on the training set, as shown at block 182.

Figure 6:
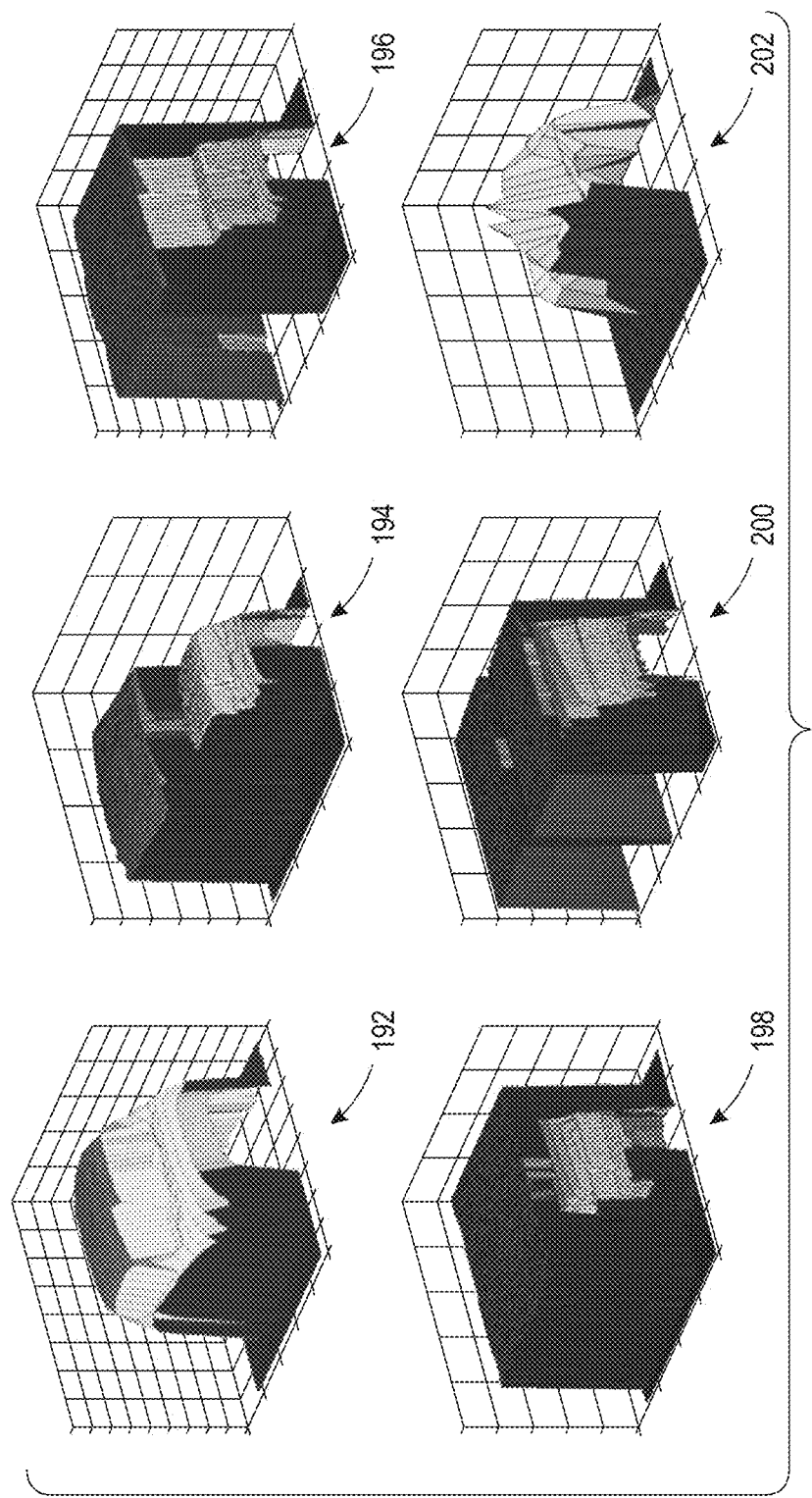
FIG. 6 illustrates sample graphs depicting 3D renderings of laser scanner profiles for six example vehicle classes from left to right as follows: passenger vehicle, passenger vehicle with one trailer, truck, truck with one trailer, truck with two trailers, and a motorcycle.

Note that the actual database used for experiments included a set of laser profiles captured in the context of a public road. Scanner profiles for each vehicle were obtained as described herein. In some cases, the following vehicle classes were manually annotated: passenger vehicle, passenger vehicle with a trailer, truck, truck with a trailer, truck with two trailers, and motorcycle. Laser profiles obtained for these sample classes are graphically illustrated in FIG. 6. That is, FIG. 6 illustrates sample graphs 192, 194, 196, 198, 200, 2002 depicting 3D renderings of laser scanner profiles for six example vehicle classes from left to right as follows: passenger vehicle, passenger vehicle with one trailer, truck, truck with one trailer, truck with two trailers, and a motorcycle.

In total a number of 30,000 vehicles were annotated. This set was split into training (40%), validation (20%), and test (40%). The training set is used to estimate the classifier models (w and b), as well as any other models required in the feature vector computation such as the PCA and Gaussian mixture model (GMM) needed for the Fisher vectors representing the Fisher image signatures (FIS) and Fisher laser signatures (FLS).

The validation set is used to select all the parameters (training parameters and feature parameters) for each feature type evaluated. This includes final dimensions (in the case of resizing or PCA projections), number of Gaussians and the parameters needed to train the SGD classifiers. Finally, for each feature type, the models corresponding to the best parameters are evaluated in the test set.

The aim of our experiments was to compare different features in the same framework. We therefore trained one-versus-all linear classifiers on the features described in section II as well as some of their combinations. Here, under combination we mean feature concatenation, e.g. MSP+ATT is the concatenation of the mean side profile (MFP) feature with the attribute based (ATT) features.

Before showing the experimental results, we will briefly recall the basic features:
  ATT: The attribute based feature.
  RAW: The raw profile features.
  FIS: Fisher image signatures.
  MSP and FSP: Mean side and frontal profiles, respectively.
  FIS: The Fisher laser signatures are Fisher vectors. For each of the features considered, we measure the global accuracy (number of vehicles correctly detected), and the per-class accuracy (mean accuracy over classes).

At first glance, it appears that all methods perform similarly in terms of per-vehicle accuracy. But note the minimum per-vehicle accuracy is 95.3%, as this is the fraction of passenger vehicles in the test set. Although this means that the distribution of classes has a strong bias, this situation is usually encountered in roads. Moreover, in this setting the final figure of interest for the tolling operator is the per-vehicle accuracy. Therefore, in these situations the small differences observed do matter.

However, to have a more comprehensive picture of the classification accuracy we also measure the average accuracy per class. It can be observed that Fisher vectors on images obtain the best per-vehicle accuracy, and obtain a per-class accuracy significantly higher than the baselines. It can also be observed that projection profiles perform similarly to baselines, but when concatenated with high-level features, they obtain the best per-class accuracy, and also the second highest per-vehicle accuracy. In view of these observations, the image-inspired features show advantages with respect to the baselines.

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine, such that the instructions, which execute via the processor of the computer or other programmable data-processing apparatus, create means for implementing the functions/acts specified in the block or blocks discussed herein, such as, for example, the various instructions discussed and shown with respect to the figures herein.

These computer program instructions may also be stored in a computer-readable memory that can direct a computer or other programmable data-processing apparatus to function in a particular manner, such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 7:
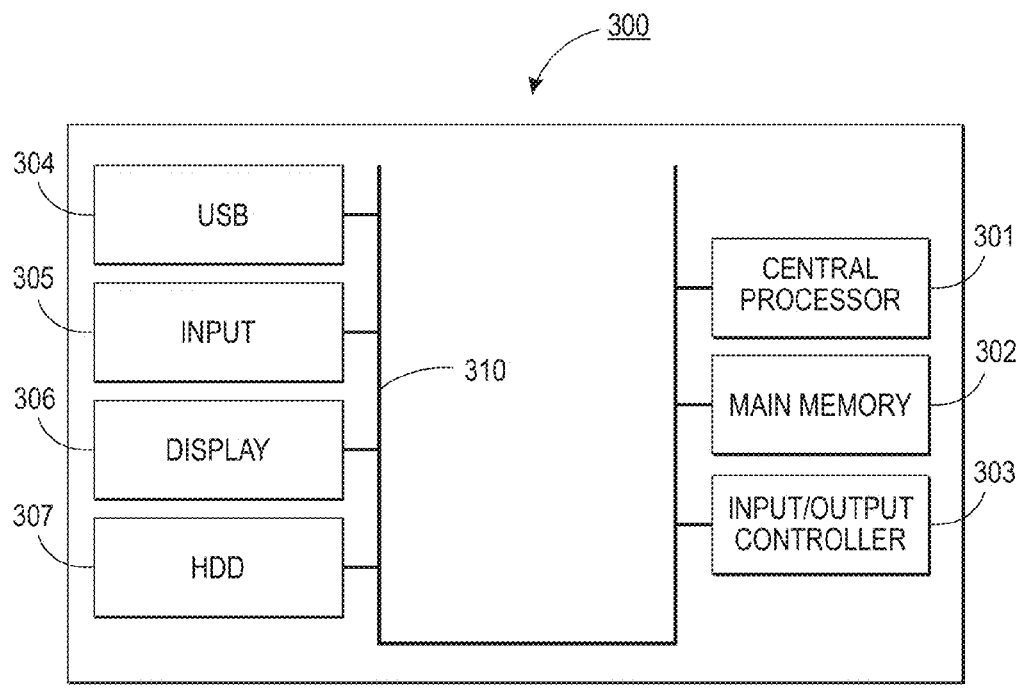
FIG. 7 illustrates a schematic view of a computer system, which can be implemented in accordance with one or more of the disclosed embodiments.
Figure 8:
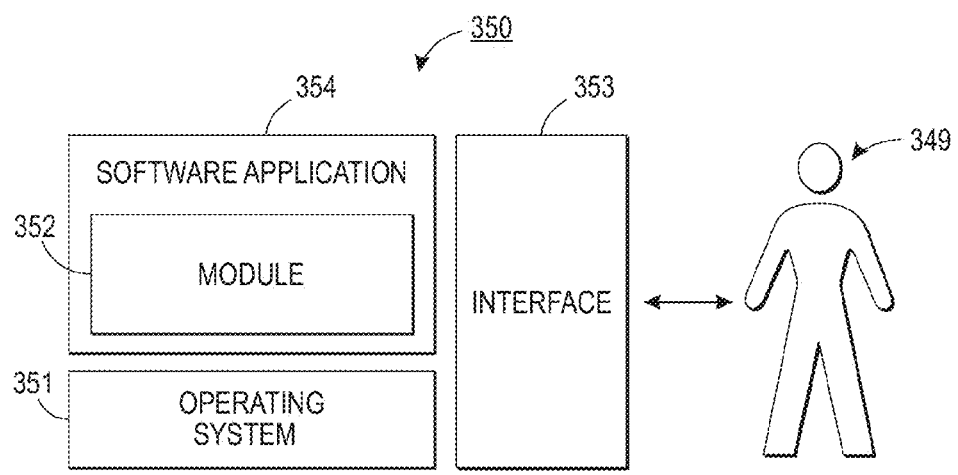
FIG. 8 illustrates a schematic view of a software system including an anomaly detection module, an operating system, and a user interface, in accordance with one or more embodiments.

FIGS. 7-8 are provided as exemplary diagrams of data-processing environments in which embodiments of the present invention may be implemented. It should be appreciated that FIG. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, the disclosed embodiments may be implemented in the context of a data-processing system 300 that can include, for example, a central processor 301 (or other processors), a main memory 302, a controller 303, and in some embodiments, a USB (Universal Serial Bus) 304 or other appropriate peripheral connection. System 300 can also include an input device 305 (e.g., a keyboard, pointing device such as a mouse, etc), a display 306, and an HDD (Hard Disk Drive) 307 (e.g., mass storage). As illustrated, the various components of data-processing system 300 can communicate electronically through a system bus 310 or similar architecture. The system bus 310 may be, for example, a subsystem that transfers data between, for example, computer components within data-processing system 300 or to and from other data-processing devices, components, computers, etc.

FIG. 8 illustrates a computer software system 350, which may be employed for directing the operation of the data-processing system 300 depicted in FIG. 7. Software application 354, stored in memory 302 and/or on HDD 307 generally can include and/or can be associated with a kernel or operating system 351 and a shell or interface 353. One or more application programs, such as module(s) 352, may be "loaded" (i.e., transferred from mass storage or HDD 307 into the main memory 302) for execution by the data-processing system 300. In the example shown in FIG. 8, module 352 can be implemented as, for example, a software module that performs the logical instructions or operations of FIGS. 1, 3, 5 and so forth.

The data-processing system 300 can receive user commands and data through user interface 353 accessible by a user 349. These inputs may then be acted upon by the data-processing system 300 in accordance with instructions from operating system 351 and/or software application 354 and any software module(s) 352 thereof.

The discussion herein is thus intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules (e.g., module 352) can include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 353 (e.g., a graphical user interface), can serve to display results, whereupon a user may supply additional inputs or terminate a particular session. In some embodiments, operating system 151 and interface 353 can be implemented in the context of a "windows" system. It can be appreciated, of course, that other types of systems are potential. For example, rather than a traditional "windows" system, other operation systems, such as, for example, a real time operating system (RTOS) more commonly employed in wireless systems may also be employed with respect to operating system 351 and interface 353.

FIGS. 7-8 are thus intended as examples, and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, Unix, Linux, and the like.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:
1. A method for vehicle classification utilizing a laser scanner, said method comprising:
scanning at least one vehicle with a laser scanner comprising a time-of-flight measuring device that emits short pulses of light toward said at least one vehicle to generate scanned data, said scanning is repeated in a varying set of angles and each scan covers a linear row up to 100 degrees, wherein a number of rows depending on the length and/or speed of the vehicle;
compiling with a processor data indicative of an optical profile of said at least one vehicle from said scanned data generated from said laser scanner;
signal pre-processing with said processor said optical profile associated with said at least one vehicle, wherein said optical profile comprises a laser profile that is pre-processed with said processor wherein an input for all feature descriptors comprises a 2D cropped laser signal corresponding to a largest component in an original laser profile with respect to said laser profile;
extracting with said processor particular features from said optical profile after preprocessing said optical profile, said particular features including at least two attribute features extracted by segmenting said laser profile into units with threshold heuristics; and
classifying with at least one trained classifier said at least one vehicle based on said particular features extracted from said optical profile, said at least one trained classifier comprising a one-versus all linear classifier.

2. The method of claim 1 wherein said signal pre-processing with said processor said optical profile associated with said at least one vehicle, further comprises:
isolating at least one individual profile from said data indicative of said optical profile;
correcting scan reading errors associated with scanning said at least one vehicle utilizing said laser scanner; and
segmenting data indicative of a vehicle body with respect to said at least one vehicle from said data indicative of said optical profile.

3. The method of claim 1 wherein extracting with said processor particular features from said optical profile after said signal pre-processing said optical profile, further comprises:
extracting said particular features including Fisher vectors as a part of a Fisher framework to build Fisher laser signatures, said particular features including a set of local patches comprising sub-regions of at least one Fisher laser signature among said Fisher laser signatures, wherein said local patches are extracted from a regular grid of coordinates in different scales.

4. The method of claim 3 wherein extracting with said processor said particular features from said optical profile after signal pre-processing said optical profile, further comprises:
extracting said particular features including profile features by computing an integral in a horizontal direction and in a vertical direction with respect to said optical profile.

5. The method of claim 4 wherein classifying with said at least one trained linear classifier said at least one vehicle based on said particular features extracted from said optical feature, further comprises:
training said at least one linear classifier utilizing said particular features extracted from said optical feature to produce said at least one trained linear classifier; and
classifying said at least one vehicle based on data output from said at least one trained linear classifier.

6. The method of claim 5 further comprising configuring said at least one trained linear classifier to comprise an SVM (Support Vector Machine) trained via SGD (Stochastic Gradient Descent) and wherein said at least two attribute features are selected from among a plurality of attribute features extracted from said laser profile, said plurality of attribute features including a width of said laser profile, a length of said laser profile, a maximum height of said laser profile, a number of units, and a maximum height of said first unit, and wherein said laser profile comprises a 2D laser profile.

7. The method of claim 5 wherein said particular features extracted from said optical feature includes human-used attributes and said at least one trained classifier comprises a classifier trained by machine learning.

8. The method of claim 5 wherein:
said particular features extracted from said optical feature include a feature set extracted from profile images that include: raw profile features; Fisher image signatures; and Fisher laser signatures; and
said laser scanner is located on a gantry in a road having a plurality of lanes, said laser scanner having a laser curtain facing downwards and perpendicular to a direction of traffic so that said laser scanner measures a height of said at least one vehicle in at least on transversal slice.

9. A system for vehicle classification utilizing a laser scanner, said system comprising:
at least one laser scanner comprising a time-of-flight measuring device that emits short pulses of light toward said at least one vehicle to generate scanned data, said scanning is repeated in a varying set of angles and each scan covers a linear row up to 100 degrees, wherein a number of rows depending on the length and/or speed of the vehicle;
at least one processor that communicates with said at least one laser scanner; and
a non-transitory computer-usable medium embodying computer program code, said non-transitory computer-usable medium communicating with said at least one processor, said computer program code comprising instructions executable by said at least one processor and configured for:
scanning at least one vehicle with said at least one laser scanner to compile data indicative of an optical profile of said at least one vehicle;
signal pre-processing said optical profile associated with said at least one vehicle, wherein said optical profile comprises a laser profile that is pre-processed with said processor wherein an input for all feature descriptors comprises a 2D cropped laser signal corresponding to a largest component in an original laser profile with respect to said laser profile;
extracting particular features from said optical profile after preprocessing said optical profile, said particular features including at least two attribute features extracted by segmenting said laser profile into units with threshold heuristics; and
classifying with at least one trained classifier said at least one vehicle based on said particular features extracted from said optical profile, said at least one trained classifier comprising a one-versus all linear classifier.

10. The system of claim 9 wherein said instructions for signal pre-processing with said at least one processor said optical profile associated with said at least one vehicle, further comprise instructions configured for:
isolating at least one individual profile from said data indicative of said optical profile;
correcting scan reading errors associated with scanning said at least one vehicle utilizing said laser scanner; and
segmenting data indicative of a vehicle body of said at least one vehicle from said data indicative of said optical profile.

11. The system of claim 9 wherein said instructions for extracting particular features from said optical profile after said signal pre-processing d opt profile, further comprise instructions configured for:
extracting said particular features including Fisher vectors as a part of a Fisher framework to build Fisher laser signatures that are square-rooted and L2-normalized.

12. The system of claim 9 wherein said instructions for extracting said particular features from said optical profile after said signal pre-processing said optical profile, further comprise instructions configured for:
extracting said particular features including profile features by computing an integral in a horizontal direction and in a vertical direction with respect to said optical profile, said at least one laser scanner located on a gantry in a road having a plurality of lanes, said at least one laser scanner having a laser curtain facing downwards and perpendicular to a direction of traffic so that said at least one laser scanner measures a height of said at least one vehicle in at least on transversal slice.

13. The system of claim 12 wherein said instructions for classifying said at least one vehicle based on said particular features extracted from said optical feature, further comprise instructions configured for:
training at least one linear classifier utilizing said particular features extracted from said optical feature, said at least one trained classifier comprising said at least one linear classifier; and
classifying said at least one vehicle based on data output from said at least one linear classifier.

14. The system of claim 13 wherein said instructions are further modified for configuring said linear classifier to comprise an SVM (Support Vector Machine) trained via SGD (Stochastic Gradient Descent).

15. The system of claim 13 wherein said particular features extracted from said optical feature includes human-used attributes.

16. The system of claim 13 wherein said particular features extracted from said optical feature include a feature set extracted from profile images that include: raw profile features; Fisher image signatures; and Fisher laser signatures.

17. A non-transitory processor-readable medium storing code representing instructions to cause a process for vehicle classification utilizing a laser scanner, said code comprising code to:
scan at least one vehicle utilizing a laser scanner to compile data indicative of an optical profile of said at least one vehicle, said scanning is repeated in a varying set of angles and each scan covers a linear row up to 100 degrees, wherein a number of rows depending on the length and/or speed of the vehicle;
pre-process said optical profile associated with said at least one vehicle, wherein said optical profile comprises a laser profile that is preprocessed with said processor wherein an input for all feature descriptors comprises a 2D cropped laser signal corresponding to a largest component in an original laser profile with respect to said laser profile;
extract particular features from said optical profile after preprocessing said optical profile, said particular features including at least two attribute features extracted by segmenting said laser profile into units with threshold heuristics; and
classify said at least one vehicle with at least one trained classifier based on said particular features extracted from said optical feature, said at least one trained classifier comprising a one-versus all linear classifier.

18. The non-transitory processor-readable medium of claim 17 wherein said code to pre-process said optical profile associated with said at least one vehicle, further comprises code to:
    isolate at least one individual profile from said data indicative of said optical profile;
    correct scan reading errors associated scanning said at least one vehicle utilizing said laser scanner; and
    segment data indicative of a vehicle body of said at least one vehicle from said data indicative of said optical profile.

19. The non-transitory processor-readable medium of claim 17 wherein said code to extract particular features from said optical profile after preprocessing said optical profile, further comprises code to:
    extract said particular features including Fisher vectors, said particular features including a set of local patches comprising sub-regions of at least one Fisher laser signature, wherein said local patches are extracted from a regular grid of coordinates in different scales.

20. The non-transitory processor-readable medium of claim 17 wherein said code to extract said particular features from said optical profile after preprocessing said optical profile, further comprises code to:
    extract said particular features including profile features by computing an integral in a horizontal direction and in a vertical direction with respect to said optical profile, wherein said particular features include at least two attribute features selected from among a plurality of attribute features extracted from said laser profile, said plurality of attribute features including a width of said laser profile, a length of said laser profile, a maximum height of said laser profile, a number of units, and a maximum height of said first unit, and wherein said laser profile comprises a 2D laser profile.

* * * * *